Nov. 11, 1924.

A. L. EVANS 1,514,842

CUTTING TOOL

Filed Sept. 17, 1923

A. L. Evans
INVENTOR

BY Victor J. Evans
ATTORNEY

WITNESS:

Patented Nov. 11, 1924.

1,514,842

UNITED STATES PATENT OFFICE.

ASHRI LEO EVANS, OF BOSTON, MASSACHUSETTS.

CUTTING TOOL.

Application filed September 17, 1923. Serial No. 663,259.

*To all whom it may concern:*

Be it known that I, ASHRI LEO EVANS, a citizen of the British West Indies, residing at Boston, in the county of Suffolk and State of Massachusetts, have invented new and useful Improvements in Cutting Tools, of which the following is a specification.

This invention relates to a cutting tool for use in planers and the like, the general object of the invention being to provide a single tool for cutting dove-tail grooves, the tool being especially designed for cutting babbitt ways in brass linings of axle boxes and other bearings.

This invention also consists in certain other features of construction and in the combination and arrangement of the several parts to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
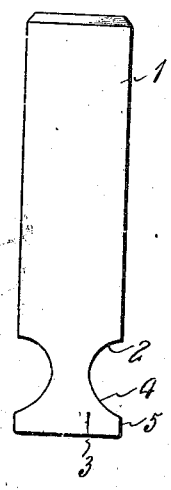
Figure 1 is a face view of the improved tool.
Figure 2:
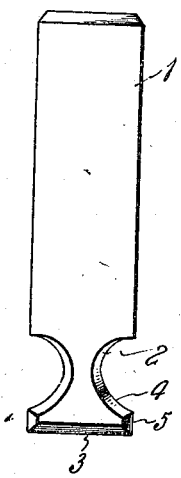
Figure 2 is a rear view thereof.
Figure 3:
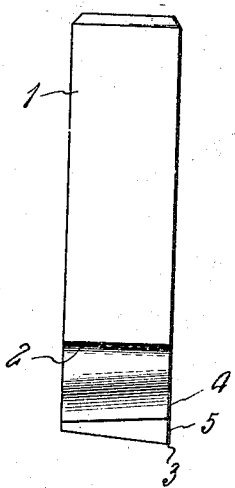
Figure 3 is an edge view.
Figure 4:
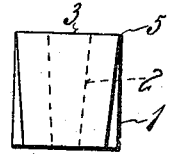
Figure 4 is a bottom plan view.

In these views, 1 indicates the body of the tool, the lower end of which is provided with a recess 2 at each edge thereof which makes the cutting end of the tool of substantially T-shape. The edges of this portion are beveled from front to rear so as to produce the cutting edge 3 at the end of the tool, the curved cutting edge 4 at each side edge thereof and the short, vertical cutting edges 5 which merge into the edges 3 and 4.

This tool will form dove-tail shaped grooves in the work piece by first using the edge 3 to form the groove and then undercutting the walls by the edges 4 and 5. The parts are so formed as to give free action by providing the right amount of clearance and the tool has considerable strength. It can be easily sharpened and can be manufactured to sell at low cost.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A cutting tool of the class described comprising a body having a curved recess at each edge adjacent its cutting end, to make the cutting portion of substantially T-shape, said portion having its edges beveled from front to rear to provide a lower cutting edge, a pair of curved cutting edges and short vertical cutting edges which connect the curved edges with the end edge.

In testimony whereof I have affixed my signature.

ASHRI LEO EVANS.